Nov. 11, 1941.  G. W. PENNEY  2,262,370
SMOKE METER
Filed Aug. 18, 1939   2 Sheets-Sheet 1
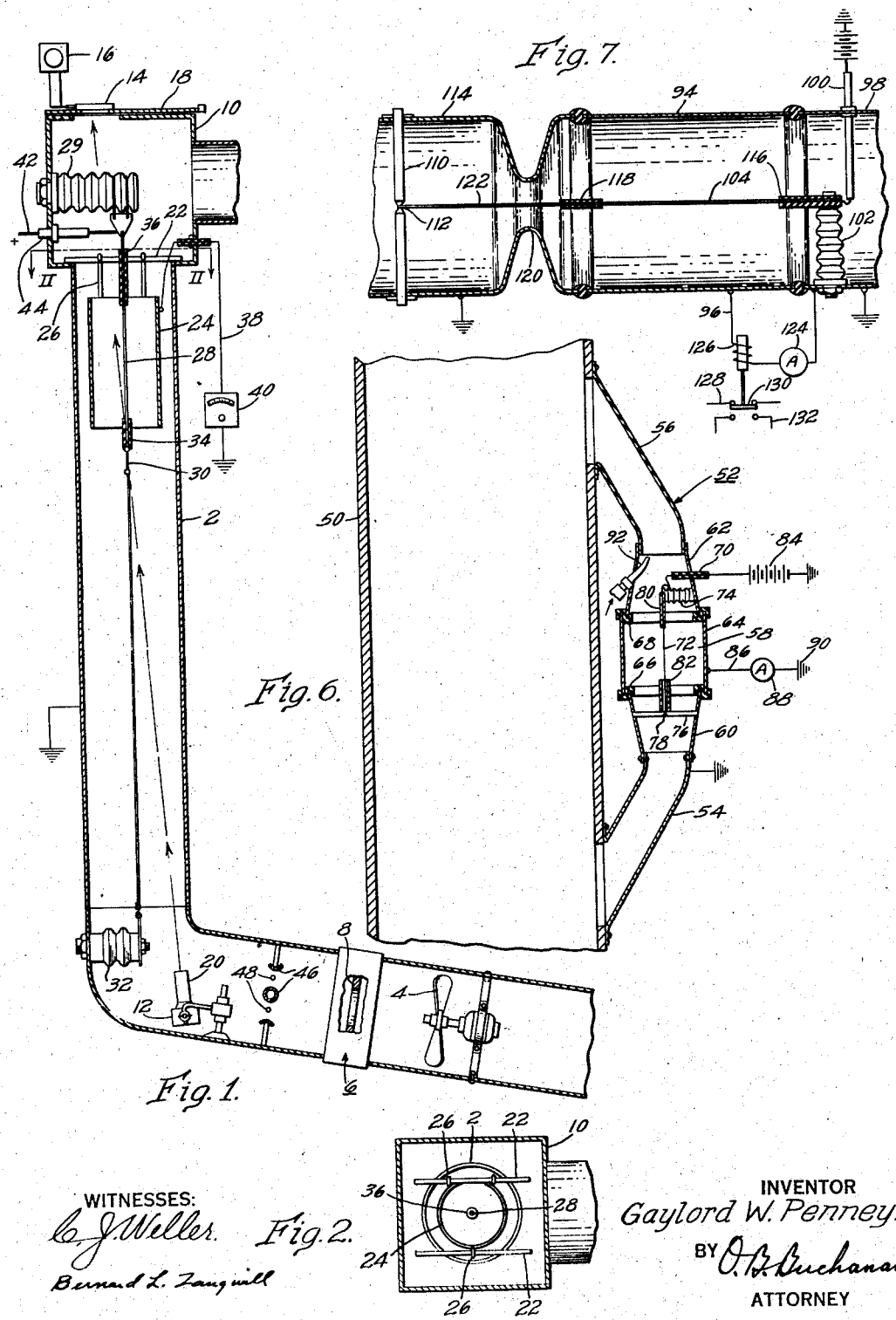
WITNESSES:
C. J. Weller
Bernard L. Zangwill
INVENTOR
Gaylord W. Penney.
BY O. B. Buchanan
ATTORNEY Nov. 11, 1941.                G. W. PENNEY                    2,262,370
                              SMOKE METER
                          Filed Aug. 18, 1939            2 Sheets-Sheet 2

INVENTOR
Gaylord W. Penney.
BY
O. B. Buchanan
ATTORNEY

Patented Nov. 11, 1941

2,262,370

UNITED STATES PATENT OFFICE 2,262,370

SMOKE METER

Gaylord W. Penney, Wilkinsburg, Pa., assignor to Westinghouse Electric & Manufacturing Company, East Pittsburgh, Pa., a corporation of Pennsylvania Application August 18, 1939, Serial No. 290,813

21 Claims. (Cl. 175—183)

My invention relates to a method of and means for determining a characteristic of a gas stream containing particulate matter, which characteristic concerns the opacity of the gas stream due to such particulate matter.

Generally, the opacity of particle-containing gases has heretofore been determined by photosensitive means involving a light-sensitive device and a source of illuminating means positioned at opposed sides of a space through which the gas flowed. Such an apparatus has the disadvantage that the window or equivalent in front of the light-sensitive means tends to become dirty, and that, with the course of time, the photo-sensitive device may change in its response, or the illuminating means may change in light-intensity.

In accordance with my invention, I make use of a phenomenon which, so far as I am aware, has never before been employed for the purpose. I have discovered that when a gas that contains particles of matter is passed through an electrostatic field, the ionizing current will vary in some relation to the amount and size of the particles passing through the field, and inasmuch as these affect the opacity of the gas stream, I am able to determine this characteristic by measuring the ionizing current, and may even apply the variation in ionizing current to control apparatus. The particulate matter may be ordinary dust, smokes, fogs, or the like, capable of being electrically charged; and which hereinafter are, for convenience and to avoid confusion, designated generically as dust or dust particles.

The manner in which my invention can be carried out, and its advantages and applications, will be apparent from the following description thereof, taken in conjunction with the accompanying drawings in which:

Figure 1 indicates a construction by which electrical measurements determined in accordance with my invention were compared to opacity measurements as determined by light-sensitive means;

Fig. 2 is a section on the line II—II of Fig. 1;

Fig. 6 is a sectional view showing, somewhat diagrammatically, a practical construction of an instrument built in accordance with my invention and applied to a vertical smokestack, and Fig. 7 is a sectional view showing a modified form of apparatus for carrying out my invention and adapted to be disposed horizontally.

Figure 3:
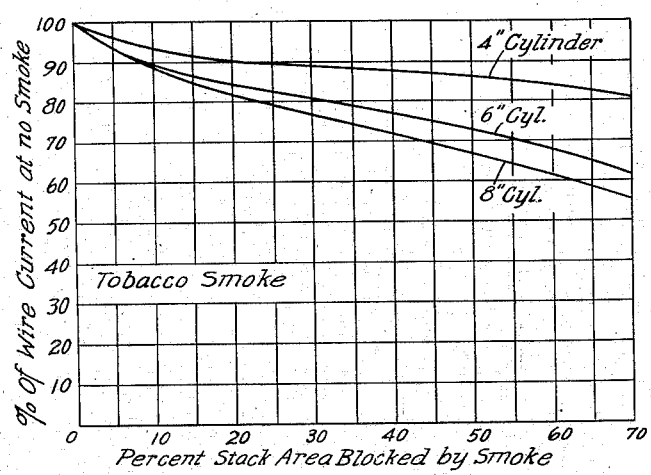
Fig. 3 are curves showing the results obtained in accordance with my invention, using tobacco smoke as the particulate matter in the gases.

In the course of certain investigations, I have found that the ionizing current in an ionized electrostatic field through which air or gas is flowing falls quite sharply when the gas contains dust, and if the dust is of consistent character, I have found that the drop in current bears some relation to the denseness of the dust in the air or gas.

In order to further investigate the matter, I constructed an apparatus along the lines shown in Fig. 1. This apparatus comprised an eight-foot vertical stack 2 of furnace pipe having a diameter of nine inches, and forming part of a closed conduit system which included a blower and air-flow measuring means, shown diagrammatically, and designated respectively, by the reference numerals 4 and 6, the air-flow measuring means including an orifice 8 in a duct of the same diameter as the stack 2. The closed conduit system also comprised a box 10 having an aperture fitting the top of the stack 2, and a means, not shown, was provided by which dust could be introduced into the gaseous stream circulating within the conduit system.

Two organizations for measuring the opacity of the air, or denseness of the dust therein, were installed in the conduit system. One measuring organization involved the usual apparatus employed for the purpose, namely; light means shining a beam across a portion of the conduit system and falling upon a photo-sensitive device; while the other was built along the lines of my invention.

The former organization comprised a light source 12 at the bottom of the stack 2, and which sent a narrow, concentrated beam of light through the length of the stack to fall upon a photo-sensitive device 14 connected to a suitable indicating apparatus 16 for determining the variation in the light-responsive characteristic of the device 14 with variations in intensity of the light falling upon it. The aforesaid parts of the light-sensitive organization are well-known and need not be described in any further detail. However, the device 14 was mounted upon a slide 18 having a suitable window-closed aperture, the slide being removable so that the window could be cleaned between, and even during, test runs. As a further precaution made in the interests of accuracy a long cardboard tube 20 served to protect the ligth source 12 from fogging during a run. The light source and its protecting tube were removably mounted in the conduit system so that they, too, could be cleaned and checked at any time.

The other measuring organization comprised two, spaced, quartz rods 22 resting on the bottom of the box 10, and across the open top of the stack 2. An open-ended cylindrical receiving electrode 24 of smaller diameter than the stack 2, and of a one-foot length, was suspended from the rods 22 by means of insulating hooks 26 so that the electrode 24 was electrically isolated from the conduit system.

Insulatedly strung through the center of the electrode 24 was an ionizing wire 28 suspended from a high voltage bushing 29 fastened in the box 10. After passing through the center of the electrode 24, the wire was terminated and connected to an insulating string 30 which traversed the remainder of the stack 2 to a tie-bushing 32 below the stack 2. Glass tubing 34 and 36 was used to encase the ionizing wire for an inch below and above its entrance into and exit from the cylindrical electrode 24 for the purpose of eliminating any possible stray end effects due to the sharp ends of the cylinder. This exposed about ten inches of the wire inside the receiving electrode 24 and in view of the tubular or cylindrical shape of electrode 24, the electrostatic field involved in the measurements was definitely confined and defined.

A fully-insulated wire 38 was conductively connected to the cylindrical electrode 24 and to one terminal of a current measuring means shown in this embodiment as a current indicating instrument 40, in this case, a microammeter, so that the ionizing current flowing between the ionizing wire 28 and the electrode 24 could be measured. To complete the circuit the second terminal of the instrument 40 was grounded. A high-voltage direct-current source of power for the circuit had its negative terminal grounded and the other terminal connected to an end 42 of the wire 28 which passed through a high-voltage insulating tube 44.

The conduit system was so arranged that the cylindrical electrode 24 and the ionizing wire 28 could be replaced by similar elements of different size; in the case of the electrode by metallic cylinders of different diameters, and in the case of the ionizing wire by conducting wires of tungsten of different diameters but in sizes following the teachings of my Patent No. 2,129,783 granted September 13, 1939, and assigned to Westinghouse Electric & Manufacturing Company. Among these teachings are: that by utilizing wires of smaller diameter, preferably below 32 mils, at suitable ionizing currents, ozone-creating corona or discharges are avoided, and likewise the tendency to create oxides of nitrogen.

Using the two organizations described, I have been able to compare the results of my invention with that of the photo-sensitive method. It must be remembered that in dealing with the characteristic of dust-carrying gases to which this invention relates, there is no accepted standard reference or units to which the characteristic can be compared. All measurements are necessarily relative and confined to the particular method by which they are determined. However, up to now, the most commonly used method involved the photo-sensitive method employing elements such as the light source 12 and the responsive device 14. I therefore, compare the readings obtained with my method to those of a light-sensitive apparatus. My experiments indicate that the method I suggest is more reliable and consistent than prior methods.

In the operation of the electrostatic system shown in Fig. 1, a potential was applied to the ionizing wire, and air was circulated through the electrostatic field between the wire 28 and the electrode 24, the velocity of the air being sufficiently great to prevent any significant precipitation of dust on the electrode 24.

Since the air was circulated in a closed system, it was possible for me to start with clean air, and then add dust by degrees. Whenever a run was to be started anew, the conduit system would be cleaned out, and the runs repeated, beginning with clean air.

With clean air, I had found that the instrument 40 would yield a certain maximum reading for a given set of conditions, and this was also true of the indicating apparatus 16. Assuming the maximum reading of instrument 40 with clean air to be 100%, increasingly lower percentages of this maximum were obtained with air containing increasing amounts of dust. Obviously, therefore, these relative readings can be employed as an indication of the opacity of the air or the denseness of the dust in the air.

The reading of the photo-sensitive device is generally assumed to be a function of the opacity of the air, due to the presence of the dust. For the apparatus of Fig. 1, such function can be indicated as the percentages of the area of stack 2 blocked by dust, clean air indicating that none of the area was blocked.

Figure 4:
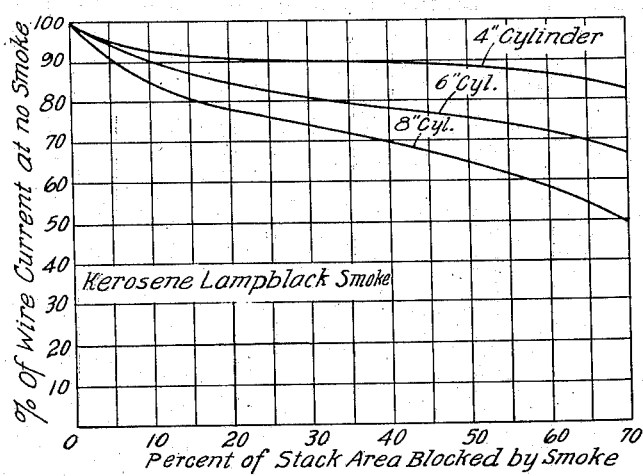
Fig. 4 are curves showing the results obtained in accordance with my invention, using kerosene lamp black smoke as the particulate matter in the gases.
Figure 5:
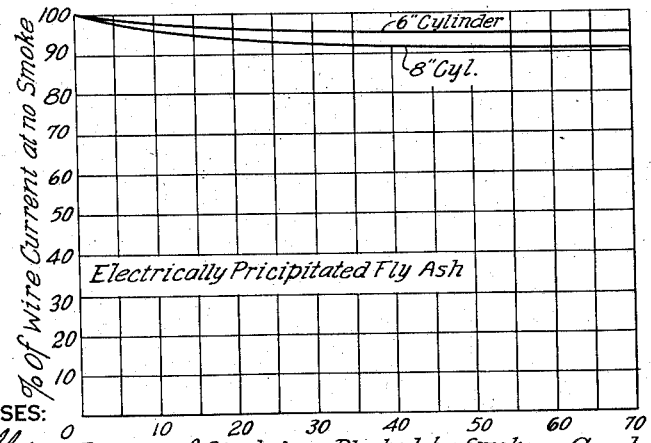
Fig. 5 are curves showing the results obtained in accordance with my invention, using precipitated fly ash as the particulate matter in the gases.

For each set of conditions existing in the conduit system, measurements were taken with both organizations so that the methods of each could be compared, and Figs. 3 to 5 indicate such relationship for three different sorts of dust, namely, tobacco smoke, kerosene lamp black smoke, and Cottrell electrically precipitated fly ash, respectively. The ordinates of these curves represent the percent of the ionizing current in wire 28 compared to the maximum value with no dust, while the abscissae indicate the percent of stack area blocked by dust as indicated by the photosensitive means.

The curves of Figs. 3–5 were obtained with 10.5 kilovolts applied between an ionizing wire of one mil diameter and different cylindrical electrodes of 4, 6, and 8-inch diameters, respectively, and an air velocity of 310 feet per minute through the electrodes. The source of potential was direct-current and the ionizing wire positive with respect to the cylindrical electrodes.

As may be observed from Figs. 3–5, the ionizing current flowing to the electrode 24 decreases with increasing amounts of dust, and that greater sensitivity is obtained with larger diameter cylinders for a given length of cylinder. The curves of Figs. 3 and 4 show rather sharp initial dips for light densities of smoke and then are reasonably linear from about 10% smoke denseness to 70% smoke denseness. Moreover, considering experimental errors, the curves for tobacco smoke and kerosene lamp smoke correspond quite closely. The initial dip is readily detectable with my invention before any appreciable change occurs in the photo-sensitive indicating device. This at once shows that my invention is superior to the latter for measuring or detecting small quantities of dust.

In making the tests, quite a bit of difficulty was experienced in keeping the light-sensitive means and the light source clean enough to return to its original reading after a test, while the ionizing current returned promptly and readily. I, therefore, feel justified in stating that my invention enables quick accurate readings, and requires little attention.

Dust particles of precipitated fly ash run from 10 to 100 microns, and above, in size, while those of tobacco smoke are less than .1 micron, and those of kerosene lamp black smoke average approximately .4 micron. Since the effect as shown in Figs. 3–5 is considerably less with precipitated fly ash than that obtained with either of the other dusts, at first glance it may appear that my invention is less sensitive to large dust particles. This discrepancy, however, can be attributed to the measuring organization and the conditions under which it was operated. After some consideration, I reasoned that there were two factors which the original measuring organization did not fully overcome. These were:

1. The normal rate of fall due to gravity for heavy particles in the neighborhood of 100 or 200 microns in size was approximately equal to the chimney velocity, of 310 ft./min., employed to obtain the curves of Figs. 3–5. This would mean that the larger particles would form a suspended cloud at the bottom of the stack 2, cutting off the light from the photo-cell, and allowing only the smaller particles to rise to the top of the stack and affect the ionizing current. In other words, the two organizations were not affected by the same dust.

2. The field strengths used were not intense enough to fully charge the large particles to a value proportionate to their areas. This would mean a smaller total number of charges per cubic centimeter of space within the cylinder, and consequently a smaller total space-charge effect.

In order to check on one or both of these factors, the cylindrical electrode 24 was lowered to the bottom of the stack and the tests repeated for both kerosene lamp smoke and precipitated fly ash. The kerosene lamp smoke curve (Fig. 4) was duplicated within experimental error, while the results with fly ash showed a marked increase in sensitivity compared to Fig. 5. This improvement may be attributed to the fact that the measuring cylinder and associated elements were now under the influence of the larger dust particles as well as the lighter ones. The curve for fly ash with the ionizing field in the bottom of the stack was still, however, somewhat above the values obtained with tobacco smoke and kerosene lamp smoke, which, as previously mentioned, were fairly close together. Apparently, then, the second factor also plays a large part in the results obtained with larger size particles.

Accordingly, to assure more complete charging of the larger particles, I provided the apparatus of Fig. 1 with a pre-ionizing unit comprising grounded, curved electrodes 46 alternately disposed on each side of two spaced insulated ionizing wires 48 built into the duct before the stack 2, all parallel to each other and transverse to the gas-flow. This unit was run with an ionizing wire current of 120 micro-amperes per foot as contrasted to the 10 micro-amperes current per foot in the measuring wire 28. Using such a pre-ionizing unit, the sensitivity of my measuring organization for larger dust particles was still further increased. In all frankness, it should be stated that there was still a discrepancy between the results obtained with kerosene lamp smoke and precipitated fly ash. A method of more completely charging the dust particles would undoubtedly make the result obtained with the two dusts correspond more closely, but would increase the complexity of the set-up.

I prefer to make all current measurements from the isolated ground electrode 24, which, because it is isolated and of predetermined exposed area to the space charge between it and the ionizing wire, will yield results unaffected by stray effects or other space charges to the rest of the conduit system.

In accordance with my invention, therefore, I have provided an organization for measuring a characteristic of the dust in a gaseous stream, which organization I hereinafter call a "smoke meter," for the want of a recognized term for a device such as I have described.

In order to observe the effect of other variables upon the readings of the meter, I varied the ionizing wire diameter in a smoke meter whose other conditions remained constant, and found that a larger diameter gave larger readings, based on either constant wire currents or constant voltage between the wires and the cylindrical electrode 24. A practical difficulty is soon reached, however, since increasing voltages lead to difficulties such as, for example, flashovers, insulator leakage and corona losses.

The length of the cylinder is primarily determined by the air velocities through it; the collectible currents obtained by it, the values of which should be readable; and the electrostatic field within it which should preferably be of large extent to reduce the possibilities of error.

I also investigated the ratio of variations between readings for no dust and a predetermined amount of dust with different ionizing currents, and found that greater differences occurred with smaller ionizing currents. In other words, the smoke meter with a given wire is more sensitive when operated at the lower ionizing current values. While this may seem inconsistent with the desire for higher dust charge, it must be remembered that in a device such as the smoke meter, there are two space charges within the cylinder which affect the current. The first is due to the charged dust particles, and is, for a given amount of dust, proportional to the voltage on the wire. The other is due to the air ions within the cylinder, and depends only on the current from the wire. When the latter is high, the ion space charge due to it is also high, and may mask the effect of variation in dust space charge. The lower the initial wire current, the lower is this masking space-charge, and consequently a larger percentage of total space charge is due to charged dust particles. I have found that a wire current of about 5 to 10 microamperes per foot of wire yielded good sensitivity.

As a final check on this meter, it was considered necessary to determine the dependence of the reading with varying air or smoke velocity. With a fixed cylinder size, wire size, and voltage, and a constant dust denseness as read by the photo-sensitive organization, the velocity of the gas stream was slowly increased and the wire current noted. The wire current remained constant up to a gas velocity of approximately 500 feet per minute, and at greater velocities the current started to rise toward its value with no dust in the gas stream. This would indicate that, with the particular smoke meter tested, the dust particles did not have time to charge up fully at gas velocities above 500 feet per minute, and, consequently, produced a weaker space charge effect. For larger velocities a longer cylinder, or pre-ionization, or some similar means for assuring full charging may be employed, although, obviously, relative denseness comparisons for any particular dust can be obtained without complete charging of the dust particles.

While I have explained the more important variables entering into the design of a smoke meter for the purposes set forth, it should be recognized that each meter will be adapted to the use for which it may be designed. This, of course, is in common with the design of other instruments. For example, a microammeter has design features differing from those of a meter for measuring commercial amperages but the general principles underlying each are generally the same. It is because I believe my smoke meter to be entirely novel that I have described with some detail what factors should be considered in the design of a smoke meter to be used for certain conditions.

My invention may be applied practically to a number of purposes. For example, it may be used to measure the efficiency of an air-cleaning system. Thus by inserting the smoke meter in the air conduit after the cleaning apparatus, the instrument 40 will give an indication of how clean the air coming from the air-cleaning system really is. The reading of the instrument may itself serve to indicate when the air-cleaning apparatus requires attention. Thus, if the air-cleaning system be mechanical, a relatively low reading may indicate that the dust filtering apparatus requires cleaning or replacing. If the air-cleaning system is an electrical precipitator device, the instrument 40 may be employed to indicate the efficiency of the precipitator, and may indicate when the collecting electrodes of the precipitator require attention, that is, the collecting electrodes might be so coated with dust that they are not operating at their maximum efficiency.

In Fig. 6 I show a further application of my invention as applied to a smokestack 50 which is provided with a by-pass indicated in its entirety by the reference numeral 52. The by-pass comprises two sections of pipe 54 and 56 connected to the stack 50, so that a portion of the gases flowing through the stack may be by-passed through a smoke meter 58.

The smoke meter comprises a lower metallic pipe section 60 fitted over the section 54 and an upper pipe section 62 fitted over the pipe section 56. The pipe sections may be so designed that when the smoke meter is to be positioned, the section 60 will slide downwardly on the section 54, so that the top end of the section 62 is clear of the lower end of the section 56. This enables the smoke meter to be placed in position or removed. The sections 60 and 62 have portions converging outwardly to a required diameter so that an electrode 64 may be secured to the ends which face each other.

In accordance with my invention, the electrode 64 should be, preferably, electrically isolated and for this purpose a band of insulation 66 is disposed between the section 60 and the end of the electrode 64 which is secured to it, and an insulating band 68 serves a similar purpose for isolating the upper end of the receiving electrode 64 from the lower end of the section 62. Inasmuch as the electrode 64 is substantially at the same potential as the remaining sections of the pipe system including, for instance, the sections 54, 56, 60 and 62, the insulation 66 and 68 need not be designed for insulating high voltage, their purpose being merely to isolate the section 64 electrically.

An insulating tube 70 is secured to and extends through one wall of the section 62, and serves as a means for insulating an ionizing wire 72 which passes through the section 62. A high voltage insulator 74 is also secured to the section 62 protruding inwardly therein. The wire 72 may be secured to the free end of this insulator and then extended axially downwardly through the electrode 64, its lower end being secured by wrapping it around an insulating bar 76 across the inside of the section 60. The bar 76 is suitably notched as at 78 so that the wire 72 may be positioned properly and maintained in tension. A glass tube 80 may be suitably secured to the free end of the insulator 74, and a glass tube 82 may be suitably secured to the bar 76, the extents of these glass tubes being sufficient to eliminate stray end effects, as described for the tubes 34 and 36 of Fig. 1.

The positive terminal of a direct current source of power 84 is connected to the ionizing wire 72, this source of power having its other terminal grounded. The measuring circuit 86 can be conductively connected to the electrode 64 in any suitable manner, as, for example, by a clip welded to the electrode or by a bolt or a binding post secured thereto, and this circuit includes a current measuring means 88. In order to complete the circuit the other end is grounded as shown at 90.

An injector 92 for creating a forced draft through the by-pass 52 may also be provided as an additional appurtenance to the smoke meter, or any other suitable draft-creating means may obviously be employed if one is found necessary.

In Fig. 7 I show a horizontally-disposed smoke meter having a pre-ionizing unit constructed to provide a pre-ionizing zone. The instrument of Fig. 7 includes a conduit which comprises an electrically isolated receiving electrode 94 to which is connected the current measuring circuit 96. The conduit further comprises a section 98 provided with insulating tube 100, and an insulator 102 by means of which an ionizing wire 104 may be passed from the outside of the meter to the inside. The wire has one end secured to the free end of the insulator in any suitable manner, then passes axially through the conduit, the other end being secured to an insulating bar 110 having a notch 112 to facilitate the tying of the wire to it. The bar 110 is preferably narrow so as not to interfere seriously with the gas flow through the conduit and is secured across a section 114 of the conduit.

Suitable insulating tubes 116 and 118 are aligned with the edges of the isolated electrode 94 and surround the ionizing wire. They serve a purpose such as described for the tubes 34 and 36 of Fig. 1, and 80 and 82 of Fig. 6. The section 114 is provided with a narrow portion 120 about a contiguous portion 122 of the ionizing wire which is between the insulator 118 and the bar 110. Because of this narrow portion 120, the electrostatic field between the wire portion 122 and the section 120 is made more intense, and therefore serves as a pre-ionizing zone.

It may be observed that the current measuring means of this embodiment includes a current-indicating instrument 124 and a current-responsive control relay 126. It is obvious that one or the other may be omitted and that likewise a control relay such as relay 126 may be provided for any of the other embodiments. In Fig. 7 the control relay may maintain closed a circuit 128 including contactor 130 while the denseness of dust particles is below a predetermined value or the gas below a predetermined opacity, so that a relatively large ionizing current flows in the circuit 96. If the denseness of the dust or the opacity of the gas should increase so that current falls below the value at which the relay 126 will release its contactor, the circuit 128 will be opened and a circuit 132 may be closed. Any suitable control apparatus or signals may be provided in one or the other of the circuits 128 and 132, or both.

The embodiment of Fig. 7 is preferably employed for gases having larger dust particles and for this reason it is preferred to dispose it horizontally so that the falling effect of the dust particles is substantially eliminated, although the smoke meter of Fig. 7 may also be used vertically.

It is desired to observe that while I have referred to the control relay 126 and the current-indicating instrument 124 as responsive to denseness of dust in the gas or the opacity of the gas, I do this for lack of a suitable term to describe the characteristics to which my smoke meter actually responds. It is these two characteristics that are most similar to the characteristics to which my smoke meter responds, and these terms have, therefore, been employed.

It is also desired to observe that the term "measuring means" applies generically to current-responsive devices described in the particular embodiments, either as an ammeter instrument 124, or as a current-responsive relay 126, and it is obvious that other indicating or control devices responsive to the described effects can be substituted, and are, therefore, to be included in the more generic expression "measuring means," and their operation in the expression "measuring," or the like.

While I have described my invention as having certain characteristics and functions, it is obvious that many equivalents may be conceived, and other apparatus designed to carry out the methods of my invention. I desire, therefore, that the appended claims be considered in that light.

I claim as my invention:

1. In a method for determining a characteristic of gases containing dust, which characteristic is akin to the denseness of the dust in the gas, or the opacity of the gas due to dust; the steps of establishing a unidirectionally ionized electrostatic field by a substantially constant potential voltage source, passing gases possibly containing dust through said field at a velocity to prevent any significant amount of said dust from leaving said gases while in said field but to permit the dust to affect the ionizing current through said field, and measuring the ionized current through said field with the gases flowing through it whereby to determine said characteristic.

2. In a method for determining a characteristic of gases containing dust, which characteristic is akin to the denseness of the dust in the gas, or the opacity of the gas due to dust; the steps of establishing an ionized electrostatic field, passing gases through said field, electrically charging any dust particles contained in said gases before entering said field, and measuring the relative effect on the ionizing current in said field by the charged dust particles passing through said field whereby to determine said characteristic.

3. In a method for determining a characteristic of gases containing dust, which characteristic is akin to the denseness of the dust in the gas, or the opacity of the gas due to dust; the steps of establishing an ionized electrostatic field between spaced, isolated, ionizing and collecting electrodes, passing gases through said field, electrically charging dust particles contained in said gases, and measuring the ionizing current collected by said collecting electrode when said charged dust particles are passing through said field, whereby to determine said characteristic.

4. In a method for determining a characteristic of gases containing dust, which characteristic is akin to the denseness of the dust in the gas, or the opacity of the gas due to dust; the steps of establishing an ionized electrostatic field between spaced, isolated, ionizing and collecting electrodes, passing gases through said field, electrically charging dust particles contained in said gases, and measuring the ionizing current collected by said collecting electrode when said charged dust particles are passing through said field whereby to determine said characteristic, the gases being passed through said field at a velocity high enough to prevent the depositing of any significant amount of dust on said electrodes.

5. In a method for determining a characteristic of gases containing dust, which characteristic is akin to the denseness of the dust in the gas, or the opacity of the gas due to dust, the steps of establishing an ionized electrostatic field between spaced, isolated, ionizing and collecting electrodes, passing gases through said field, electrically charging dust particles contained in said gases, and measuring the ionizing current collected by said collecting electrode when said charged dust particles are passing through said field whereby to determine said characteristic, the gases being passed through said field at a velocity high enough to prevent the depositing of any appreciable amount of dust on said electrodes, but low enough to permit a full effect of said charged dust particles.

6. In a method for determining a characteristic of gases containing dust, which characteristic is akin to the denseness of the dust in the gas, or the opacity of the gas due to dust, the steps of creating measurable continuous unidirectional space current across a space, inserting electrically-charged dust into said space, and measuring the relative effects of different densenesses of charged dust on said space current by a current-measuring device sensitive to small currents in the order of microamperes.

7. In a device of the type described; spaced electrode means, a potential source for establishing a unidirectional electrostatic field between said spaced electrode means, means for conveying dust-carrying gases through the said field, means for electrically charging dust particles in said gases, and an instrument means for indicating the effect of said charged dust on said field.

8. In a device of the type described; spaced electrode means, a potential source for establishing an electrostatic field between said spaced electrode means, means for conveying dust-carrying gases through the said field, means for electrically charging dust particles in said gases, and a control means responsive to a predetermined effect of said charged dust on said field.

9. In a device of the type described; spaced electrode means, a potential source for establishing a unidirectional electrostatic field between said spaced electrode means, means for conveying dust-carrying gases through the said field, means for electrically charging dust particles in said gases, and measuring means responsive to the effect of said charged dust on said field.

10. In a device of the class described, a substantially electrically-isolated hollow tubular electrode, an ionizing wire, means for insulatedly supporting said wire inside said electrode in spaced relation thereto, means for connecting one terminal of a source of potential to said wire, and connecting means for connecting, in effect, the other terminal of said source of power to said electrode, said connecting means including current-measuring means.

11. In a device of the class described, a conduit through which gas possibly containing dust is adapted to pass, said conduit including a substantially electrically-isolated metallic section, an ionizing wire, and means for insulatedly supporting said wire inside said section in spaced relation thereto.

12. In a device of the class described, a conduit through which gas possibly containing dust is adapted to pass, said conduit including a substantially electrically-isolated metallic section, an ionizing wire, means for insulatedly supporting said wire inside said section in spaced relation thereto and a circuit including current-measuring means connected to said section.

13. In a dust measuring device, a conduit through which gas possibly containing dust is adapted to pass, said conduit including a substantially electrically-isolated, metallic section, and a second metallic section of lesser cross-sectional area disposed adjacent to and before the first said section, an ionizing wire, and means for insulatedly supporting said wire within said sections in spaced relation thereto, said wire being disposed in the general direction in which said sections extend.

14. A dust measuring device comprising, a conduit through which gas possibly containing dust is adapted to pass, said conduit including a substantially electrically-isolated, metallic section, and a second metallic section of lesser cross-sectional area disposed adjacent to and before the first said section, an ionizing wire, and means for insulatedly supporting said wire within said sections in spaced relation thereto, said wire being disposed in the general direction in which said sections extend, and a circuit including current-measuring means connected to said isolated section.

15. A dust measuring device comprising, a conduit through which dust-carrying gas is adapted to pass, said conduit including a substantially electrically-insulated tubular metallic section, an ionizing wire, means for insulatedly supporting said wire centrally within said section in spaced relation thereto, and pre-ionizing means disposed in said conduit before said section.

16. A dust measuring device comprising, a conduit through which dust-carrying gas is adapted to pass, said conduit including a substantially electrically-insulated tubular metallic section, an ionizing wire, means for insulatedly supporting said wire centrally within said section in spaced relation thereto, pre-ionizing means disposed in said conduit before said section, and a circuit including current-measuring means connected to said tubular section.

17. In a device of the class described, a substantially electrically-isolated, hollow tubular electrode having gas inlet and outlet means, an ionizing wire through said section, means for insulatedly supporting said wire substantially axially in said electrode in spaced relation thereto, and insulating means closely about said wire extending slightly above and below the ends of said gas inlet and outlet means.

18. In combination, a conduit through which gas is adapted to flow, said conduit including a first tubular electricity-conducting section and a second tubular electricity-conducting section of lesser cross-sectional area than said first section, said second section being adjacent to said first section, said second section also being before said first section in the direction of gas flow, an ionizing wire disposed substantially centrally of said second section whereby an ionized electrostatic field may be established between said wire and said second section, ionizing electrode means disposed substantially centrally of said first section, and potential means connected to said first section and said electrode means for establishing an ionized electrostatic field between said first section and said ionizing electrode means.

19. In a device of the type described, a conduit through which gas is adapted to flow, said conduit including a plurality of tubular electricity-conducting sections in the direction of gas flow, electrode means comprising an ionizing wire disposed substantially centrally in said conduit for establishing an ionized electrostatic field between said ionizing wire and said sections, said sections having relatively different, larger and smaller inner contours.

20. In a method for determining a characteristic of gases containing dust; the steps of establishing a unidirectional ionized electrostatic field with only a unidirectional flow of charged ionized particles across said field, passing gases possibly containing dust through said field at a velocity to affect said unidirectional flow, and measuring the current through said field when said gases are in said field, whereby to determine said characteristic.

21. A dust-measuring device comprising means for providing a dust-measuring chamber, said chamber comprising electrical ionization-means and electrical receiving-electrode means disposed in ion-receiving, spaced relation to said ionization-means, electric-circuit means including a source of unidirectional potential connected to said electrodes for creating a continuous, unidirectional space-current flow in the space between said ionization-means and said receiving-electrode means, a current-measuring device for measuring substantially continuous current-flow rates for measuring the current in said electric-circuit means, said current-measuring device being sensitive to currents which are a very small fraction of an ampere, and means for causing a flow of dust-bearing gas through said chamber at a rate sufficiently high to carry off an appreciable proportion of charged dust-particles without impingement upon said receiving-electrode means under the operating conditions of the device, said receiving-electrode means being of a limited extent in the direction of gas-flow.

GAYLORD W. PENNEY.